(12) United States Patent
Raczynski et al.

(10) Patent No.: US 8,827,316 B2
(45) Date of Patent: Sep. 9, 2014

(54) TORQUE MEMBER FOR THREADED CONNECTIONS

(75) Inventors: Jody Allan Raczynski, Edmonton (CA); Jonathan Ryan Prill, Edmonton (CA)

(73) Assignee: National Oilwell Varco, L.P., Houston, TX (US)

( * ) Notice: Subject to any disclaimer, the term of this patent is extended or adjusted under 35 U.S.C. 154(b) by 108 days.

(21) Appl. No.: 12/989,388

(22) PCT Filed: Apr. 24, 2009

(86) PCT No.: PCT/US2009/041645
§ 371 (c)(1),
(2), (4) Date: Oct. 22, 2010

(87) PCT Pub. No.: WO2009/132259
PCT Pub. Date: Oct. 29, 2009

(65) Prior Publication Data
US 2011/0049873 A1    Mar. 3, 2011

Related U.S. Application Data

(60) Provisional application No. 61/047,673, filed on Apr. 24, 2008.

(51) Int. Cl.
*F16L 15/08* (2006.01)
*E21B 17/042* (2006.01)
(52) U.S. Cl.
CPC ............... *E21B 17/042* (2013.01); *F16L 15/08* (2013.01)
USPC ................................ 285/89; 285/92; 285/390

(58) Field of Classification Search
CPC .......... F16L 15/006; F16L 15/02; F16L 15/08; E21B 17/042; E21B 17/043
USPC ........................................ 285/89, 392, 92, 390
See application file for complete search history.

(56) References Cited

U.S. PATENT DOCUMENTS 1,349,518 A  *  8/1920  Lyle ............................... 285/89
2,102,072 A    12/1937  Hinderliter
(Continued)

FOREIGN PATENT DOCUMENTS

EP          0268306 A2    5/1988
GB          355528 A      8/1931
(Continued)

OTHER PUBLICATIONS

International Application No. PCT/US2009/041645 Search Report and Written Opinion dated Dec. 7, 2009.
(Continued)

*Primary Examiner* — James Hewitt
(74) *Attorney, Agent, or Firm* — Conley Rose, P.C.

(57) ABSTRACT

Apparatus and methods for increasing the torque capacity of connections between tubular members. In some embodiments, the connection is threaded. The apparatus may include a first tubular end having a torque member moveable thereon. A second tubular end is made up with the first tubular end. The torque member is moveable back toward the second tubular end. The torque member can be moved into engagement with the second tubular end, and then torqued against the second tubular end. A first torquing interface is provided between the first tubular and the second tubular by making up their respective ends, and a second torquing interface is provided therebetween by torquing the torque member against the second tubular end. A torque capacity of the made up connection is increased thereby.

12 Claims, 5 Drawing Sheets

(56) References Cited

U.S. PATENT DOCUMENTS

| | | | |
|---|---|---|---|
| 2,150,221 A | | 3/1939 | Hinderliter |
| 2,575,685 A | * | 11/1951 | Shugart et al. ................. 285/298 |
| 2,644,524 A | | 7/1953 | Baker |
| 3,359,013 A | | 12/1967 | Knox et al. |
| 3,427,050 A | | 2/1969 | Krieg |
| 3,608,933 A | | 9/1971 | Lee |
| 4,067,404 A | * | 1/1978 | Crase .............................. 175/75 |
| 4,099,745 A | | 7/1978 | Cobbs |
| 4,209,193 A | | 6/1980 | Ahlstone |
| 4,346,920 A | * | 8/1982 | Dailey ............................ 285/89 |
| 4,534,585 A | | 8/1985 | Saliger |
| 4,613,161 A | | 9/1986 | Brisco |
| 4,643,467 A | | 2/1987 | Wood |
| 4,801,160 A | | 1/1989 | Barrington |
| 5,083,821 A | * | 1/1992 | Friend ............................ 285/355 |
| 6,811,189 B1 | | 11/2004 | Delange et al. |
| 6,840,550 B2 | | 1/2005 | Sundholm |
| 2003/0168851 A1 | | 9/2003 | Winship |
| 2004/0164548 A1 | * | 8/2004 | Richey et al. ................... 285/89 |
| 2004/0211275 A1 | | 10/2004 | Fich et al. |
| 2010/0005643 A1 | | 1/2010 | Evans et al. |

FOREIGN PATENT DOCUMENTS

| | | |
|---|---|---|
| WO | 9420726 A1 | 9/1994 |
| WO | 97/11303 A1 | 3/1997 |
| WO | 2008/117172 A2 | 10/2008 |

OTHER PUBLICATIONS

Submission of Informal Comments to the Written Opinion of the International Search Authority dated Dec. 7, 2009, for International Application No. PCT/US2009/041645.

Canadian Office Action Dated Jul. 22, 2013; Canadian Application No. 2,721,587 (2 p.).

Canadian Office Action Dated Jul. 4, 2012; Canadian Application No. 2,721,587 (2 p.).

PCT/US2011/043238 International Search Report and Written Opinion Dated Nov. 26, 2012 (13 p.).

European Supplementary Search Report Dated Aug. 27, 2013; European Application No. 09736084 (6 p.).

* cited by examiner

TORQUE MEMBER FOR THREADED CONNECTIONS

CROSS-REFERENCE TO RELATED APPLICATION

This application is the U.S. National Stage under 35 U.S.C. §371 of International Patent Application No. PCT/US2009/041645 filed Apr. 24, 2009, which claims the benefit of U.S. Provisional Patent Application No. 61/047,673 filed Apr. 24, 2008, entitled "Torque Member For Threaded Connections."

STATEMENT REGARDING FEDERALLY SPONSORED RESEARCH OR DEVELOPMENT

Not applicable.

BACKGROUND

The disclosure relates to threaded tubular connections and the like. More particularly, the disclosure relates to an apparatus and method for joining tubular members using threaded sections in a manner that increases the thread torque capacity.

In the oil and gas production industry, pipe or other tubular sections may be connected via threaded connections, such as mating pin and box ends. The threaded connections are often subjected to large torsion forces, such as during downhole operations like drilling. The torque or yield strength of the connection is dictated by the thread profile, the material properties and the dimensions of the mating threaded components. However, due to space or other constraints in a well bore, often times the threaded connection design is limited as to the size and thread type that can be used, thereby limiting the yield strength of the connection. It is particularly problematic to achieve increased yield strength in a connection that is made up onto the threaded pin face. Sometimes it is necessary to have a connection that is stronger than what can be achieved in an existing design. Thus, it is advantageous to increase the yield or torque strength of a threaded connection.

To increase the torque capacity of a particular threaded connection, a thread locking compound (such as Loctite®) is sometimes applied to the threads. This tends to increase the friction between the mating threaded components, thus increasing the torque capacity of the overall connection. However, thread locking compounds are undesirable because the threaded connection can be very difficult to disassemble after makeup because the connection must be heated to break down the locking compound. This is a time consuming process and the high heat required to break apart the thread locking compound can damage equipment.

Other attempts to increase the torque capacity of the connection include using higher strength material for the threaded components or using a double shoulder type design. However, higher strength materials are generally more expensive and might not be available. Furthermore, even high strength materials, alone, might fail to meet the high torque requirements of drilling operations. Additionally, double shoulder type threaded connections require precise dimensional tolerances among the fixed outer pin face to outer box face interface and the fixed inner pin face to inner box face interface. Should these dimensions be imprecise, similar threaded connections may have torque strengths that are dissimilar, unpredictable, and yield little advantage over standard threaded connections.

Applying thread locking compound, changing the thread profile or changing material selection all present significant disadvantages when attempting to improve the yield strength of a threaded connection under high torsional loads. Thus, there remains a need for a threaded connection that advantageously increases the torque strength of a threaded connection, particularly while also staying within current downhole design specifications.

SUMMARY

The disclosed embodiments described herein overcome the various deficiencies of the prior art by providing an apparatus and method for joining tubular members with increased torque capacity. In general, embodiments include an additional torque member that is coupled to a pin component and then back against a box component that has been made up with the pin component. The torque member may be a torque nut threaded onto a threaded pin end and then back against an outer box end face while the pin end face is made up onto an inner box face. Threading the torque member back against the outer box face increases the yield strength of the threaded connection. Additionally, the moveable torque member provides the flexibility to adjust the position of the torque member shoulder relative to the interface between the pin face and the inner box face. This flexibility avoids the need for precise dimensional tolerances associated with a fixed shoulder.

In some embodiments, an apparatus for increasing the torque capacity of a tubular connection includes a first tubular member comprising a first end and a torque member moveably coupled on the first end, a second tubular member comprising a second end coupled to the first end, and wherein the torque member is moveable from a first untorqued position to a second torqued position against the second tubular member.

In some embodiments, an apparatus for increasing the torque capacity of a tubular connection includes a first tubular member coupled to a second tubular member and having a first torquing interface therebetween, and a moveable torque member coupled to the first tubular member and the second tubular member and providing a second torquing interface between the first tubular member and the second tubular member. The first torquing interface may include a pin end face and an inner box face, and the second torquing interface may include a torque member face and an outer box face.

In some embodiments, an apparatus for increasing the torque capacity of a threaded tubular connection includes a first tubular member including a pin end having a section of threads with an axial length, a second tubular member including a box end having a section of threads with an axial length less than the axial length of the pin end threaded section, and a torque member including a section of threads with an axial length less than the axial length of the pin end threaded section, wherein the pin end threaded section is configured to threadedly receive the torque member threaded section and the box end threaded section at the same time.

In some embodiments, a method for increasing the torque capacity of a tubular connection includes connecting a torque member to an end of a first tubular member, connecting an end of a second tubular member to the end of the first tubular member, torquing the first tubular member against the second tubular member, and moving the torque member into engagement with the second tubular member while the first tubular member is torqued against the second tubular member. The method may further include torquing the torque member against the second tubular member, thereby providing a second torque interface between the first tubular member and the second tubular member. The method may further include providing a first torque capacity by torquing the second tubular member against the first tubular member and providing an additional torque capacity by torquing the torque member against the second tubular. The method may further include threading the torque member onto pin end threads of the first tubular member in a first direction, threading box end threads of the second tubular member onto the pin end threads of the first tubular member in the first direction, and threading the torque member in a second opposite direction toward the box end of the second tubular member.

BRIEF DESCRIPTION OF THE DRAWINGS

For a more detailed description of the preferred embodiments of the present disclosure, reference will now be made to the accompanying drawings, wherein.

DETAILED DESCRIPTION

Figure 1:
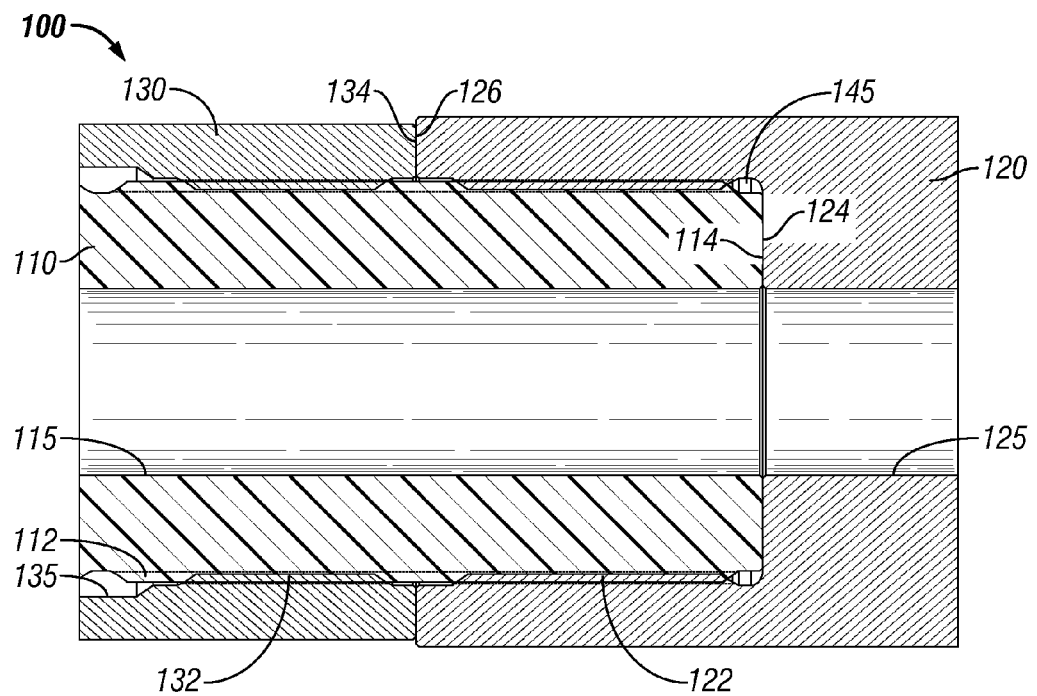
FIG. 1 is a schematic of one embodiment of a torque member apparatus.

In the drawings and description that follow, like parts are typically marked throughout the specification and drawings with the same reference numerals. The drawing figures are not necessarily to scale. Certain features of the disclosure may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, any use of any form of the terms "connect", "engage", "couple", "attach", or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". The term "box" refers to an end of a length of pipe having female threads cut into the inner diameter and the term "pin" refers to an end of a length of pipe having male threads cut into the outer diameter. In addition, reference to the terms "left" and "right" are made for purposes of ease of description. The terms "pipe," "tubular member," "casing" and the like as used herein shall include tubing and other generally cylindrical objects. The various characteristics mentioned above, as well as other features and characteristics described in more detail below, will be readily apparent to those skilled in the art upon reading the following detailed description of the embodiments, and by referring to the accompanying drawings.

Use of the concepts of the present disclosure is not limited to pipe thread connections and may find utility in other threaded connection applications, both within oilfield technology and other areas to which the concepts of the current disclosure may be applied.

Referring to FIG. 1, torque member apparatus 100 includes an end 110 of a first tubular member, an end 120 of a second tubular member, and a torque member or torque nut 130. In some embodiments, the end 110 is a pin end and the end 120 is a box end. In general operation, torque member 130 is threaded onto the unengaged pin end 110, and the box end 120 is then made up onto the pin end 110. Other manners of making up the apparatus 100 are also contemplated in accordance with the principles herein.

Pin 110 includes a first threaded section having a plurality of pin male threads 112, a pin face 114, and a central flow passage 115. In some embodiments, pin male threads 112 are located along a significant portion of the axial length of the outer diameter of pin end 110, and pin face 114 is located at the terminal end of pin 110.

Box end 120 includes a second threaded section having a plurality of box female threads 122, an inner box face 124, an outer box face 126, a box cavity 145, and a central flow passage 125. In some embodiments, box female threads 122 are located along a significant portion of the axial length of the inner diameter of the box cavity 145, and inner box face 124 is located at the inner axial portion of the box cavity 145. Outer box face 126 is located at the terminal end of box 120. In some embodiments, the axial length of the first threaded section 112 is greater than the axial length of the second threaded section 122.

Torque member 130 includes a third threaded section having a plurality of torque member female threads 132, and torque member face 134. Torque member female threads 132 are located along the axial length of the inner diameter of torque member 130 forming the through-passage 135. In some embodiments, the axial length of the first threaded section 112 is greater than the axial length of the third threaded section 132.

Figure 2:
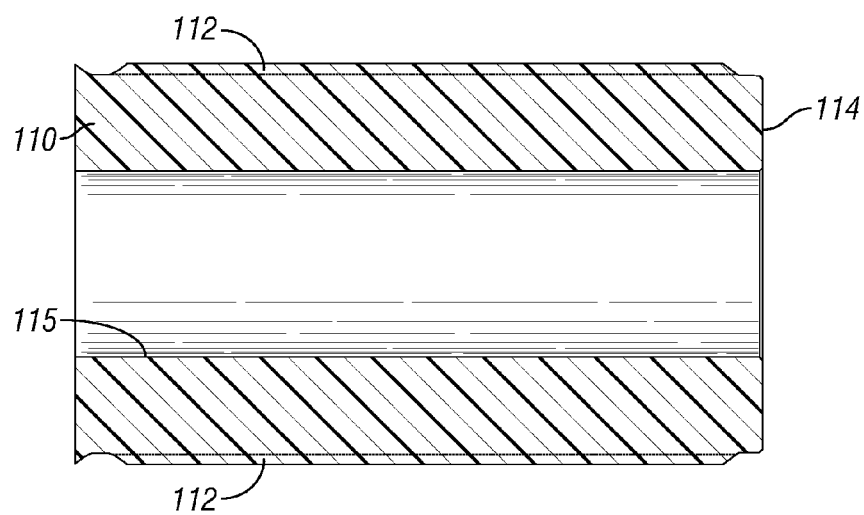
FIG. 2 is a schematic of the torque member apparatus of FIG. 1 at a first step of assembly.
Figure 3:
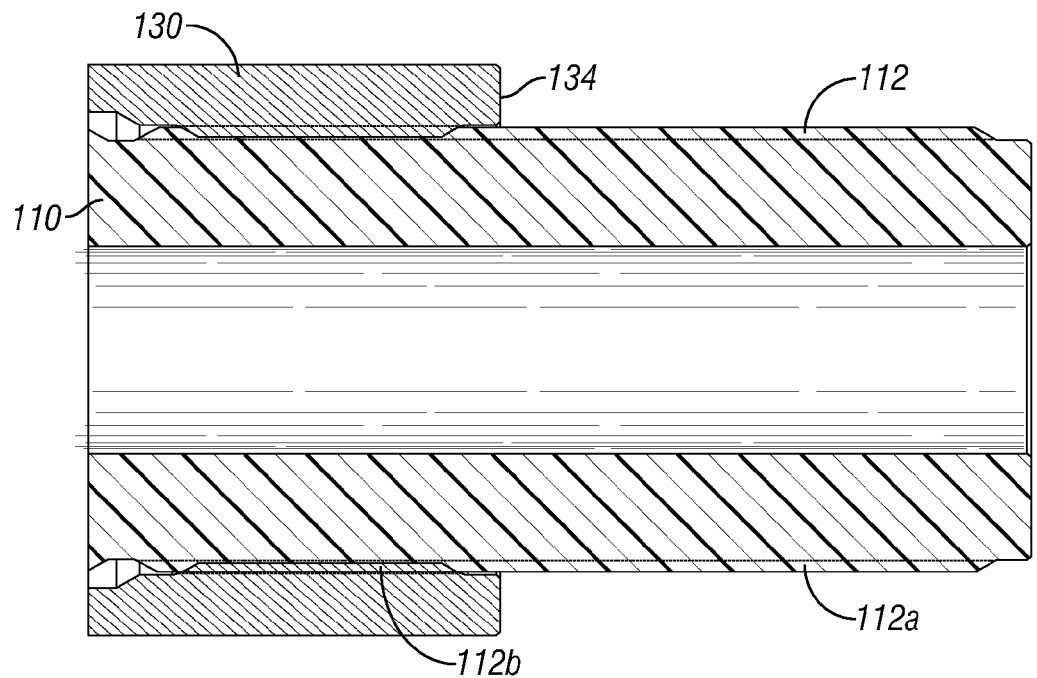
FIG. 3 is a schematic of the torque member apparatus of FIG. 1 at a second step of assembly.

FIGS. 2-5 depict embodiments of the assembly of the torque member apparatus 100. Referring initially to FIG. 2, pin 110 of torque member apparatus 100 is shown. In FIG. 3, torque member 130 is shown with torque member female threads 132 threaded onto pin male threads 112 of pin 110. In certain embodiments already described, the torque member threaded section 132 includes an axial length less than the axial length of the pin threaded section 112 such that the torque member 130 can be threaded variable distances onto the pin end 110 while also leaving exposed a portion 112a of the pin threaded section 112, as shown in FIG. 3. Consequently, there is an engaged portion 112b of the pin threads as well as the exposed portion 112a.

Figure 4:
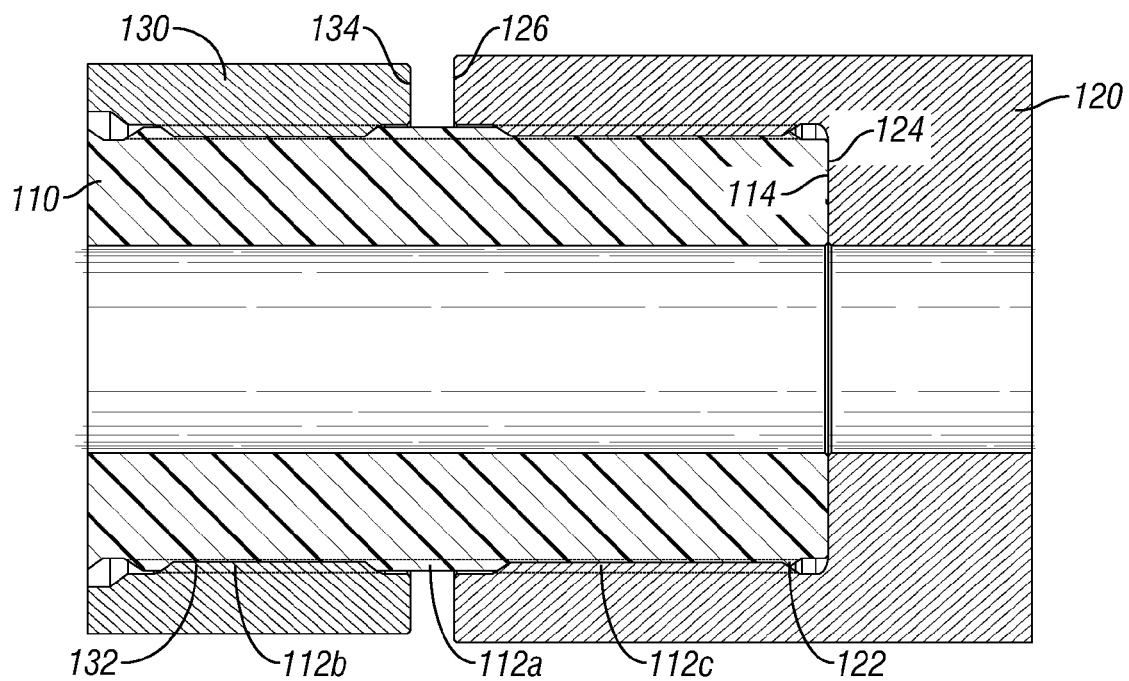
FIG. 4 is a schematic of the torque member apparatus of FIG. 1 at a third step of assembly.

Referring now to FIG. 4, pin 110 and exposed threaded portion 112a are shown threaded into box 120 such that pin face 114 contacts inner box face 124. This creates another engaged portion of threads 112c between the pin 110 and the box 120, in addition to the reduced exposed portion 112a and the torque member engaged portion 112b. In this manner, torque member 130 is spaced apart from outer box face 126 in a first, untorqued position while the pin and box ends are made up. The connection between pin 110 and box 120 is torqued to specification.

Figure 5:
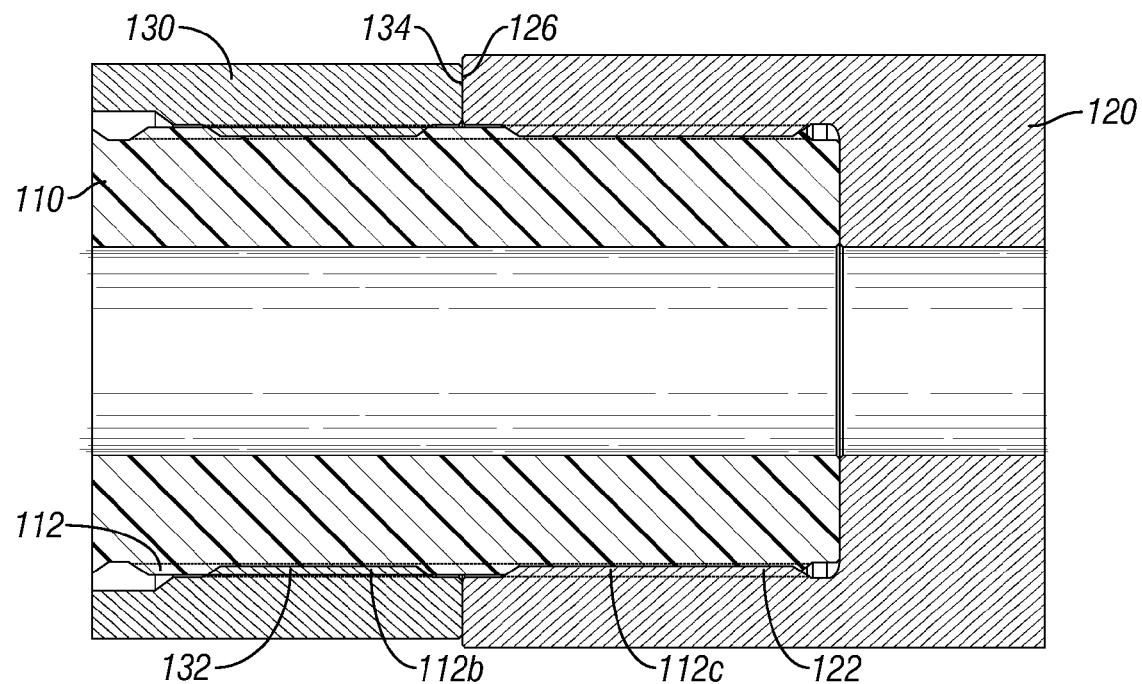
FIG. 5 is a schematic of the torque member apparatus of FIG. 1 at a fourth and final step of assembly.

Referring now to FIG. 5, torque member 130 is shown having been threaded back along the pin threads 112 toward outer box face 126 (after initially having been threaded onto pin 110 in the opposite direction). This eliminates the gap and the exposed threaded portion 112a between the torque member 130 and the outer box face 126. In this manner, torque member face 134 is brought into contact with outer box face 126. In some embodiments, the connection made up by torque member 130 and box 120 at the interface between torque member face 134 and outer box face 126 is torqued to specification providing a second, torqued position of the torque member 130 and completing the assembly of torque member apparatus 100. The controlled torquing of pin 110 into box 120 and of torque member 130 onto box face 126 provides two torque loading interfaces. In this way, the torque capacity of threaded connections is greatly increased.

Figure 6:
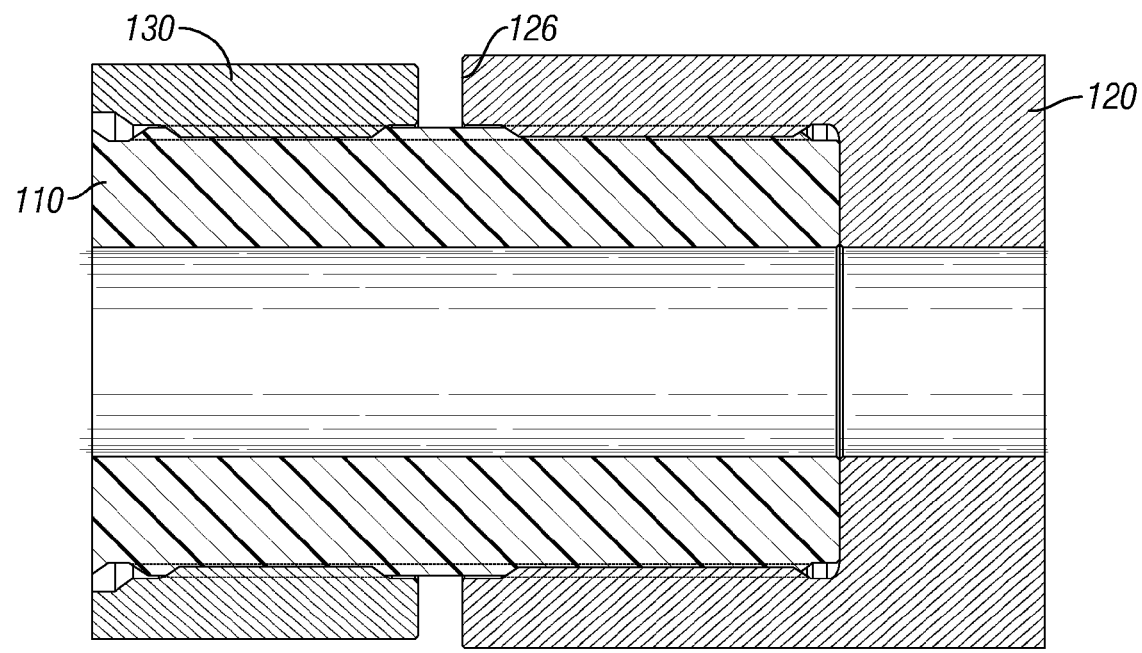
FIG. 6 is a schematic of the torque member apparatus of FIG. 1 at a first step of disassembly.
Figure 7:
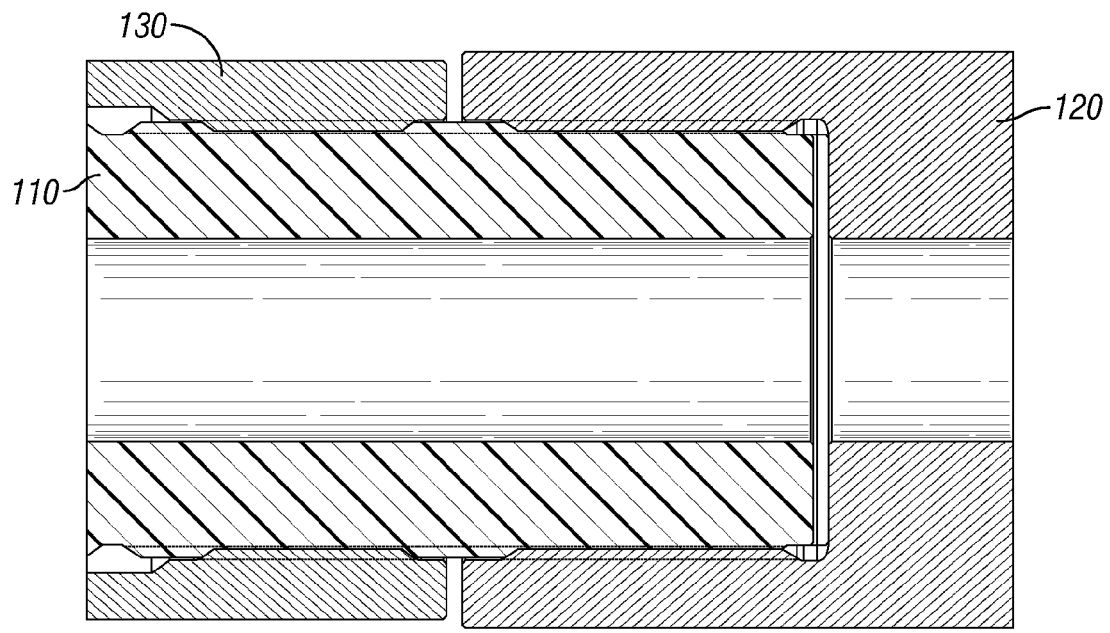
FIG. 7 is a schematic of the torque member apparatus of FIG. 1 at a second step of disassembly.
Figure 8:
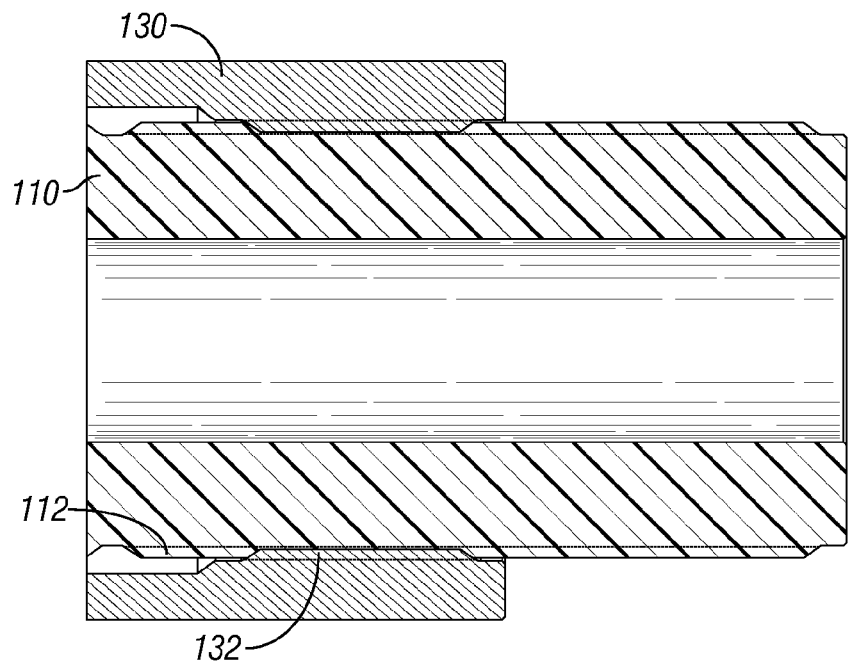
FIG. 8 is a schematic of the torque member apparatus of FIG. 1 at a third step of disassembly.
Figure 9:
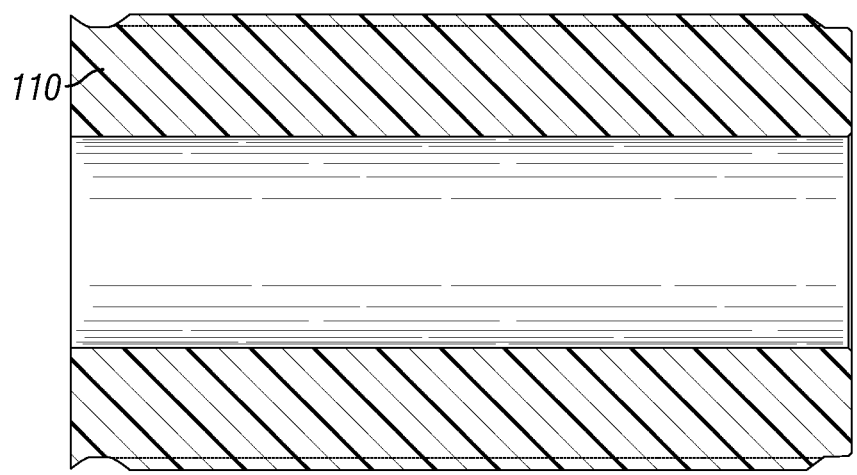
FIG. 9 is a schematic of the torque member apparatus of FIG. 1 at a fourth and final step of disassembly.

FIGS. 6-9 depict embodiments of the disassembly of the torque member apparatus 100. Referring initially to FIG. 6, the connection made up by torque member 130 and box 120 is untorqued. Torque member 130 is shown spaced apart from outer box face 126. In FIG. 7, the connection made up by pin 110 and box 120 is untorqued. In FIG. 8, pin 110 is shown with box 120 removed and with torque member female threads 132 threaded onto pin male threads 112 of pin 110. In FIG. 9, pin 110 is shown with torque member 130 unthreaded and removed, completing the disassembly of torque member apparatus 100.

Thus, in some embodiments, the moveable torque member provides a moveable shoulder that is brought into contact with the face of the second tubular for torquing purposes. In this manner, the moveable torque member provides flexibility in tolerances allowed at the torque member shoulder. A fixed shoulder provides only set tolerances and no flexibility of same. Certain embodiments include the increased torque capability of threaded connections along with predictability, repeatability and consistency in the amount of torque applied to threaded interfaces without exceeding design constraints associated with drilling operations.

In other embodiments, the connection between the tubular members includes connection means other than threads, and the torque member is coupled to the end of the first tubular by means other than threads. In such embodiments, the torque member is still adapted to be moveable relative both of the connected tubulars such that it may be clamped down onto the second tubular and provide an increased torque loading capacity of the overall tubular connection.

While the disclosure is susceptible to various modifications and alternative forms, specific embodiments thereof are shown by way of example in the drawings and description. It should be understood, however, that the drawings and detailed description thereto are not intended to limit the disclosure to the particular form disclosed, but on the contrary, the intention is to cover all modifications, equivalents and alternatives falling within the spirit and scope of the present disclosure.

What is claimed is:

1. A fluid apparatus for increasing the torque capacity of a tubular connection comprising:
   a first tubular member pin end having an uninterrupted section of threads coupled to a second tubular member box end at a first portion of the uninterrupted section of threads;
   a first torquing interface between a pin end face and an inner box face; and
   a moveable torque member threadedly coupled to the first tubular member at a second portion of the uninterrupted section of threads and engaged with the second tubular member at a second torquing interface between a torque member face and an outer box face;
   wherein the uninterrupted section of threads comprises a uniform thread form.

2. The apparatus of claim 1 wherein:
   the first and second tubular members are threadedly coupled for relative axial movement for transferring axial forces and torquing the first interface;
   the first tubular member and the torque member are threadedly coupled for relative axial movement for transferring axial forces and torquing the second interface; and
   wherein the forces transferred between the first tubular member and the torque member adjacent the second torquing interface are transferred axially to increase substantially the torquing capacity of the tubular connection.

3. A fluid apparatus for increasing the torque capacity of a tubular connection comprising:
   a first tubular member comprising a first end having an uninterrupted section of threads;
   a torque member configured to be threadedly coupled on the uninterrupted section of threads of the first end;
   a second tubular member comprising a second end configured to be threadedly coupled to the uninterrupted section of threads of the first end to form a threaded coupling, wherein each thread turn of the threaded coupling contacts an opposing thread turn;
   wherein the second end is a box end having an internally disposed first box face configured to engage with an end face of the first end forming a first torque loading interface;
   wherein the torque member is moveable from a first untorqued position to a second torqued position against the second tubular member forming a second torque loading interface.

4. The apparatus of claim 3 wherein the uninterrupted section of threads includes an exposed thread portion between the second tubular member and the torque member in the untorqued position, and the torque member is moveable to engage the exposed thread portion and an end face of the second tubular member.

5. The apparatus of claim 3 wherein the second end further comprises a second box face engaged with an end face of the torque member, forming the second torque loading interface.

6. A fluid apparatus for increasing the torque capacity of a threaded tubular connection comprising:
   a first tubular member including a pin end having an uninterrupted section of threads with an axial length and a uniform thread form over the axial length;
   a second tubular member including a box end having a section of threads with an axial length less than the axial length of the uninterrupted pin end threaded section; and
   a torque member including a section of threads with an axial length less than the axial length of the uninterrupted pin end threaded section;
   wherein the pin end threaded section is configured to threadedly receive the torque member threaded section at an inner portion of the uninterrupted section of threads and to threadedly receive the box end threaded section at an outer portion of the uninterrupted section of threads at the same time;
   wherein the pin end includes a planar pin face engagable against an internally disposed planar box face of the box end;
   wherein the torque member is threadably moveable on the uninterrupted pin end threaded section to torque a torque member face against an outer box face; and wherein there is no axial separation between the threads of the outer portion and the received threads of the box end.

7. The apparatus of claim 6 wherein the torque member is threadably moveable on the pin end threaded section when the box end is threadedly coupled with the pin end.

8. The apparatus of claim 7 wherein the planar pin face is torqued against the planar box face.

9. A method for increasing the torque capacity of a fluid tubular connection comprising:
   threadably connecting a torque member to an uninterrupted thread section of a pin end of a first tubular member;
   threadably connecting a box end thread section of a second tubular member to the uninterrupted pin end thread section;
   torquing an end face of the pin end against an inner face of the box end thereby forming a first torque loading interface providing a first torque capacity;
   moving the torque member into engagement with the second tubular member while the first tubular member is torqued against the second tubular member at the first torque loading interface; and
   torquing the torque member against the second tubular member, thereby forming a second torque loading interface, the second torque loading interface being disposed between the torque member and the second tubular member and providing a second torque capacity;
   whereby each thread turn of the box end thread section contacts a thread turn of the uninterrupted section of pin threads.

10. The method of claim 9 further comprising:
    threading the torque member onto the uninterrupted section of pin end threads of the first tubular member in a first direction;
    threading the box end thread section of the second tubular member onto the uninterrupted section of pin end threads of the first tubular member in the first direction; and
    threading the torque member in a second opposite direction toward the box end of the second tubular member to transfer axial forces in the torque member parallel to the first and second directions.

11. The method of claim 9 further comprising adjusting the position of the torque member.

12. The method of claim 9 whereby, in response to torquing the torque member, forces are transferred in an axial direction to increase the torque capacity of the tubular connection.

* * * * *